(12) United States Patent
Shimada

(10) Patent No.: US 7,710,992 B2
(45) Date of Patent: May 4, 2010

(54) COMMUNICATION DEVICE AND COMMUNICATION METHOD

(75) Inventor: Nagao Shimada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 344 days.

(21) Appl. No.: 11/892,144

(22) Filed: Aug. 20, 2007

(65) Prior Publication Data
US 2008/0080556 A1    Apr. 3, 2008

(30) Foreign Application Priority Data
Sep. 29, 2006   (JP) .............................. 2006-267550

(51) Int. Cl.
*H04L 12/56*   (2006.01)

(52) U.S. Cl. .................. 370/415; 370/230; 370/235; 370/468; 710/310

(58) Field of Classification Search ............... 370/415, 370/230, 235, 412, 413, 468, 470; 710/310
See application file for complete search history.

(56) References Cited

U.S. PATENT DOCUMENTS 6,067,408 A * 5/2000 Runaldue et al. ............ 710/307
6,539,031 B1 * 3/2003 Ngoc et al. ................. 370/470
2003/0133462 A1 * 7/2003 Schoenblum ........... 370/395.64
2005/0057551 A1 * 3/2005 Gong et al. ................. 345/211

OTHER PUBLICATIONS

Patent abstract of Japan, Japanese Publication No. 2000-200176, Published Jul. 18, 2000.
Patent abstract of Japan, Japanese Publication No. 2002-271424, Published Sep. 20, 2002.

\* cited by examiner

*Primary Examiner*—Ricky Ngo
*Assistant Examiner*—Luat Phung
(74) *Attorney, Agent, or Firm*—Staas & Halsey LLP

(57) ABSTRACT

A communication device for transmitting and receiving frames, which is capable of preventing an overflow of a buffer memory due to clock error even when the utilization factor of a transmission line is high. A frame holding section stores frames awaiting transmission. A transmission section sequentially takes out each frame from the frame holding section and outputs the frame to the transmission line, based on a control signal indicative of timing for transmitting the frame. A transmission control section initially outputs the control signal at a repetition period of T clocks (T≧2) and acquires the number of waiting frames in the frame holding section every N×T clocks (N≧2). When the number of waiting frames is equal to K (K≧1), the transmission control section makes some of transmission intervals shorter than T clocks to thereby output the control signal N+K times during next N×T clocks

6 Claims, 11 Drawing Sheets

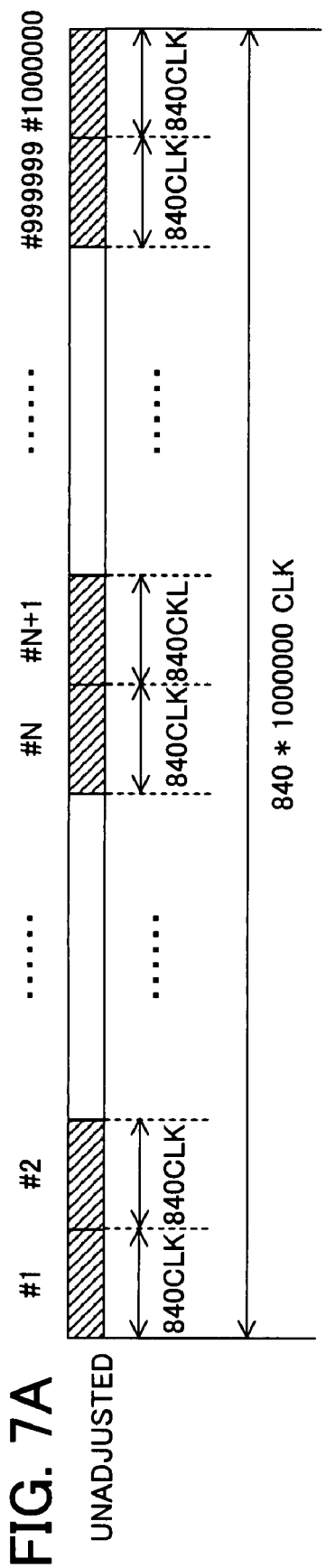
FIG. 7A UNADJUSTED
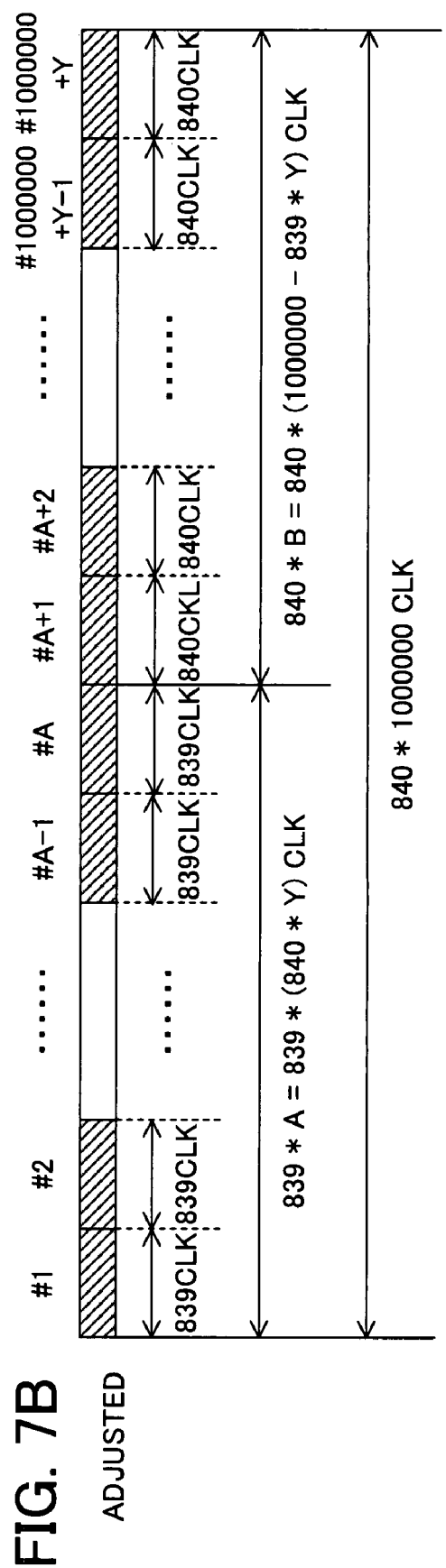
FIG. 7B ADJUSTED

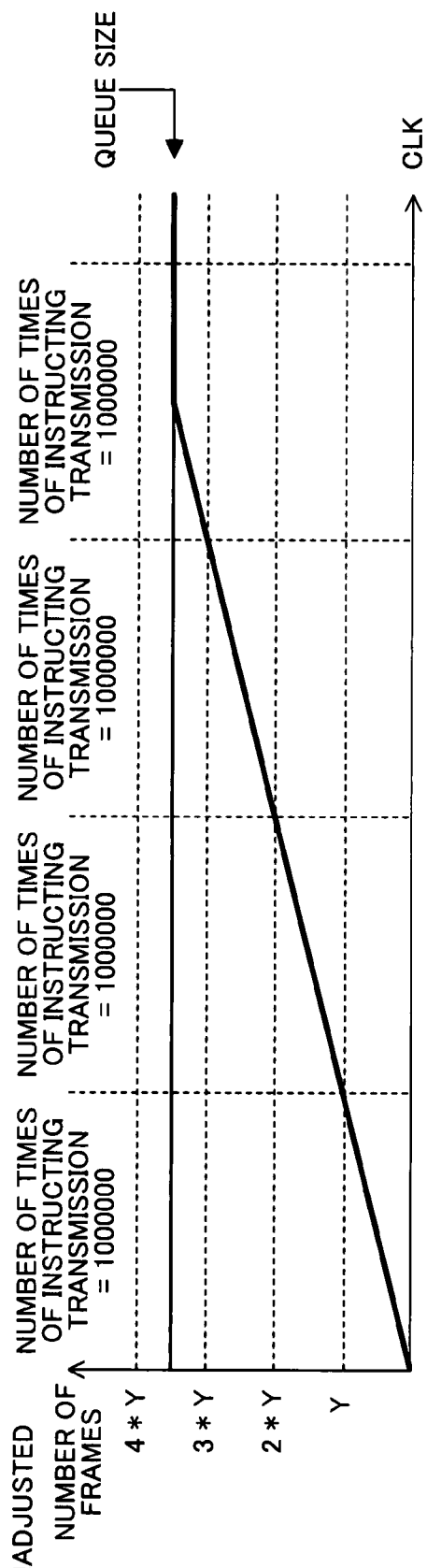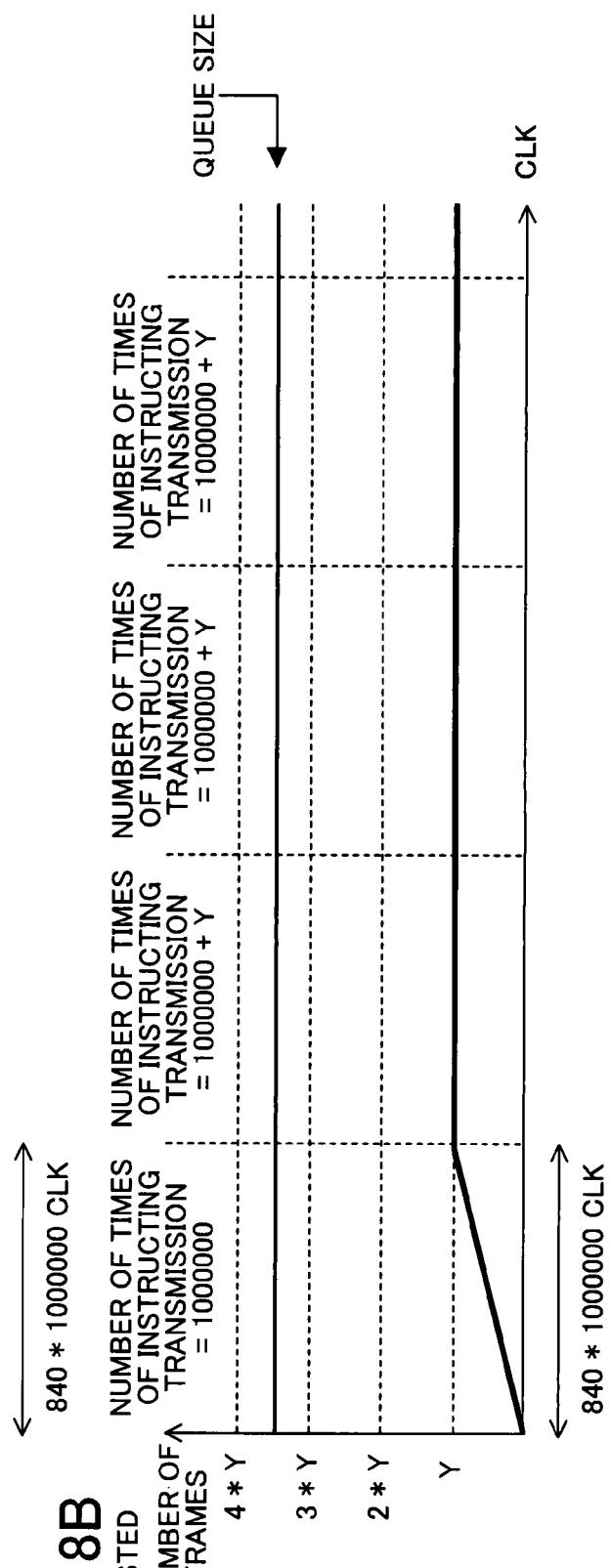

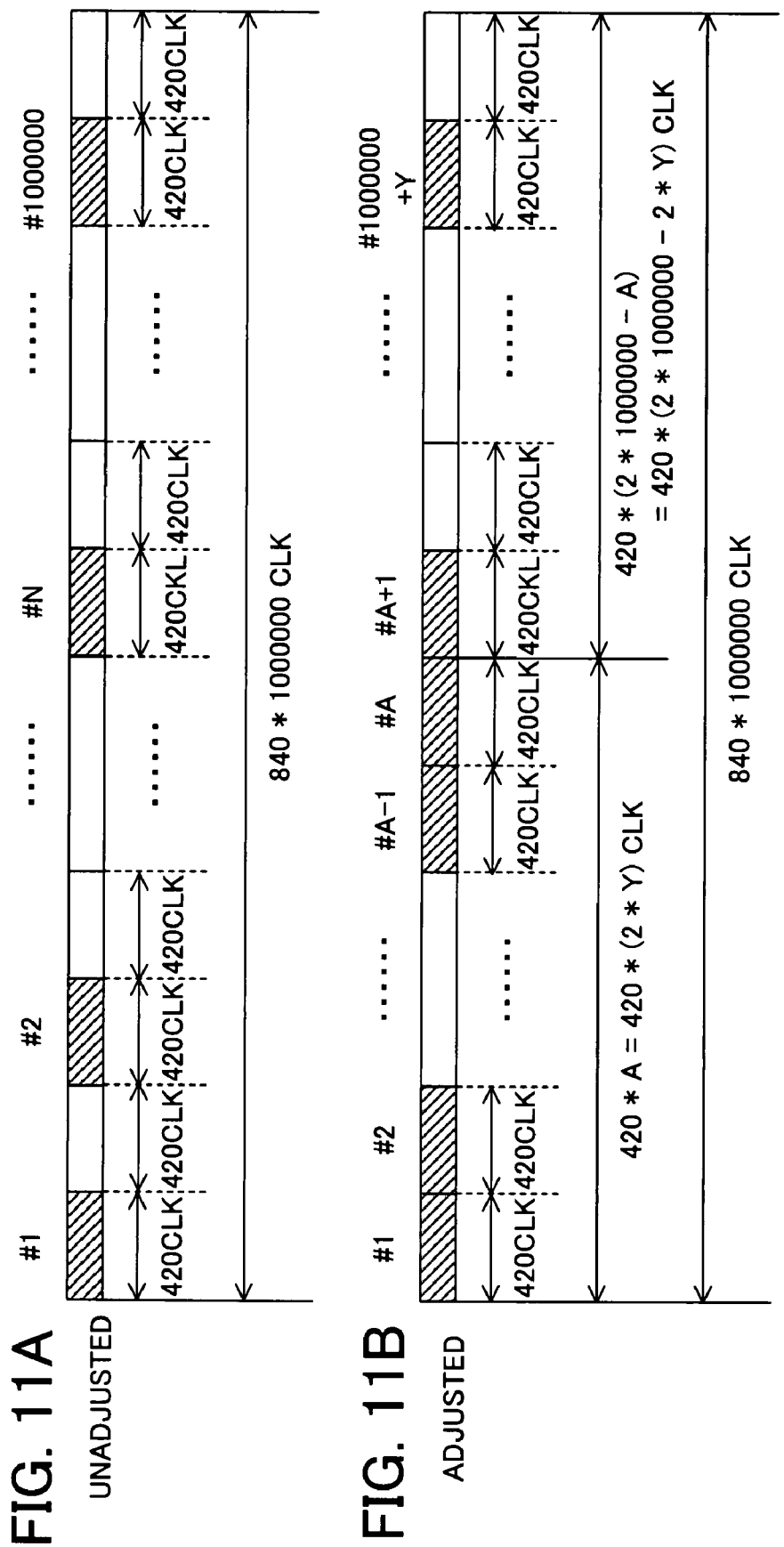

COMMUNICATION DEVICE AND COMMUNICATION METHOD

CROSS-REFERENCE TO RELATED APPLICATIONS

This application is based upon and claims the benefits of priority from the prior Japanese Patent Application No. 2006-267550 filed Sep. 29, 2006, the entire contents of which are incorporated herein by reference.

BACKGROUND OF THE INVENTION

1. Field of the Invention

This invention relates to a communication device and a communication method, and more particularly to a communication device that receives and transmits frames asynchronously via a transmission line, and a communication method executed by the communication device.

2. Description of the Related Art

In a case where data is transmitted and received between two terminal units via a network, data transmitted by one terminal unit is split into frames in a data link layer, and the frames are relayed to the other terminal unit by one or more other communication devices. The communication devices for relaying the frames are implemented e.g. by layer 2 switches.

In general, frame transmission and reception are performed asynchronously between the communication devices. More specifically, a communication device at a transmitting end and a communication device at a receiving end operate in accordance with respective independent clock signals, and hence the transmission of a frame and the reception of the same do not coincide in timing with each other. For this reason, each communication device is provided with a buffer memory for temporarily storing frames so as to accommodate the difference in timing between the transmission and reception of each frame (see e.g. Japanese Unexamined Patent Publication No. 2000-200176). As the standard for an asynchronous network, there may be mentioned Ethernet®, for example.

However, in a case where the operating speed of a receiving-end communication device is lower than that of a transmitting-end communication device, if the utilization factor of a transmission line is high, there is a fear that an overflow of the buffer memory of the receiving-end communication device may be caused by queueing delay or stagnation of frames. To eliminate this fear, there has been proposed a method of controlling intervals at which frames are sent, by the transmitting-end communication device so as to prevent queueing delay or stagnation of frames at the receiving-end communication device (see e.g. Japanese Unexamined Patent Publication No. 2002-271424). More specifically, the transmitting-end communication device transmits frames at proper intervals set in view of the operating speed of the receiving-end communication device. By thus taking into consideration the operating speed of each communication device and the bandwidth of each transmission line at the time of designing a network, it is possible to prevent queueing delay or stagnation of frames at a specific communication device.

By the way, an actual clock frequency of a communication device is not strictly identical to a theoretical clock frequency, because it is physically difficult to generate a clock signal at a frequency strictly identical to a theoretical value thereof. For example, according to the Ethernet standard, the clock has a tolerance of less than 100 ppm (Parts Per Million), i.e. less than 0.01%. Therefore, even if the operating speed of a transmitting-end communication device and that of a receiving-end communication device are theoretically identical to each other, actually, they are not strictly the same.

Conventional communication devices are not provided with any special measures for coping with clock error. Since the clock error is so minute (one clock per 10,000 clocks at the maximum), insofar as the utilization factor of a transmission line leaves room for the full utilization thereof, the queueing delay or stagnation of frames cannot be caused by clock error. However, in a network, such as a trunk network, in which the utilization factor of the transmission line is high, clock error presents a large problem. That is, if the operating speed of a receiving-end communication device becomes slower than that of a transmitting-end communication device due to clock error, frames in transmission queue at the receiving-end communication device progressively increase until an overflow of the memory buffer of the receiving-end communication device is caused.

The overflow of a memory buffer due to clock error cannot be prevented by the above-described technique disclosed in Japanese Unexamined Patent Publication No. 2002-271424. This is because it is difficult to estimate clock error of each communication device when designing a network. Further, whenever there is a change in connecting relations between communication devices, there can be a change in communication devices suffering from queueing delay of frames or in the degree of queueing delay of frames. Furthermore, if the operating speed of a specific communication device is largely changed so as to eliminate queueing delay of frames, this increases frames in transmission queue at other communication devices.

SUMMARY OF THE INVENTION

The present invention has been made in view of the above problems, and an object thereof is to provide a communication device which is capable of automatically preventing an overflow of a buffer memory due to clock error and minimizing adverse influence of compensation for the clock error on other communication devices, and a communication method therefor.

To attain the above object, in a first aspect of the present invention, there is provided a communication device that receives and transmits frames asynchronously via a transmission line. The communication device is characterized by comprising a frame holding section for storing the frames awaiting transmission, a transmission section for sequentially taking out each frame from the frame holding section and outputting the frame to the transmission line, based on a control signal indicative of timing for transmitting the frame, and a transmission control section for initially transmitting the control signal at a repetition period of T clocks (T represents an integer not smaller than 2) and acquiring a number of waiting frames in the frame holding section every N×T clocks (N represents an integer not smaller than 2), wherein when the number of waiting frames is equal to K (K represents an integer not smaller than 1), the transmission control section makes at least some of transmission intervals shorter than T clocks to thereby transmit the control signal N+K times during next N×T clocks.

Further, to attain the above object, in a second aspect of the present invention, there is provided a method of communication executed by a communication device that receives and transmits frames asynchronously via a transmission line. This method is characterized by comprising the steps of initially transmitting a control signal indicative of timing for transmitting each transmission-awaiting frame to the transmission line at a repetition period of T clocks (T represents an integer not smaller than 2) after sequentially taking out each of transmission-awaiting frames stored in a frame holding section, acquiring a number of waiting frames in the frame holding section every N×T clocks (N represents an integer not smaller than 2), and making at least some of transmission intervals shorter than T clocks when the number of waiting frames is equal to K (K represents an integer not smaller than 1), to thereby transmit the control signal N+K times during next N×T clocks.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 7A and 7B are diagrams illustrating timing of output of a transmission period signal used in the first embodiment.

FIGS. 8A and 8B are diagrams showing time series changes in the number of waiting frames in an output queue.

FIGS. 11A and 11B are diagrams illustrating timing of output of a transmission period signal used in the second embodiment.

DESCRIPTION OF THE PREFERRED EMBODIMENTS

The present invention will now be described in detail below with reference to the drawings showing preferred embodiments thereof. First, a description will be given of the outline of the invention, and then of details of embodiments thereof.

Figure 1:
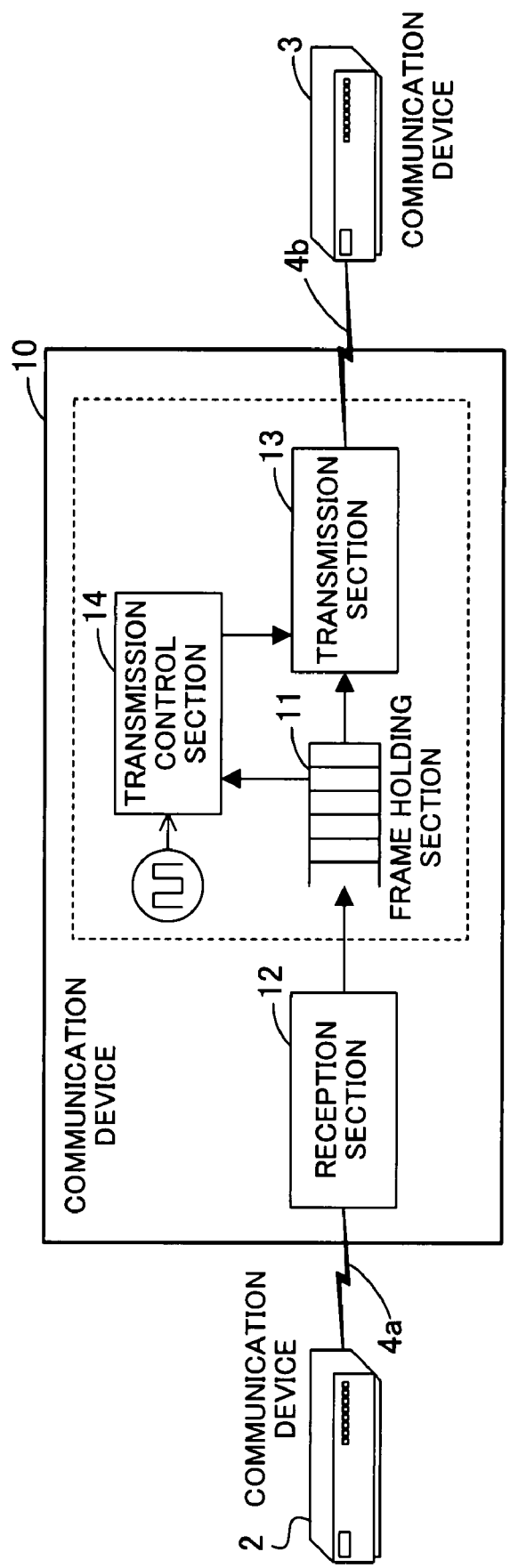
FIG. 1 is a general diagram of a communication device according to the present invention.

FIG. 1 is a general diagram of a communication device 10 according to the present invention. The communication device 10 according to the invention relays frames transmitted from a communication device 2 to a communication device 3. The communication device 10 is comprised of a frame holding section 11, a reception section 12, a transmission section 13, and a transmission control section 14. The reception section 12 is connected to the communication device 2 via a transmission line 4a. The transmission section 13 is connected to the communication device 3 via a transmission line 4b.

The frame holding section 11 holds frames awaiting transmission. The frame holding section 11 is formed e.g. by a FIFO (First In First Out) memory. The reception section 12 receives frames transmitted by the communication device 2 via the transmission line 4a, and sequentially writes the frames into the frame holding section 11. The transmission section 13 sequentially takes out frames from the leading part of the frame holding section 11 and transmits the frames to the communication device 3 via the transmission line 4b based on a control signal output by the transmission control section 14.

The transmission control section 14 initially transmits the control signal at a repetition period of T clocks (T≧2). Further, the transmission control section 14 acquires the number of waiting frames held in the frame holding section 11 whenever a period of N×T clocks (N≧2) elapses. When the acquired number of waiting frames is equal to K (K≧1), the transmission control section 14 adjusts transmission intervals such that the control signal is output N+K times during the next period of N×T clocks. In other words, at least some of the transmission intervals are made shorter than T clocks.

According to the communication device 10 configured as above, frames transmitted from the communication device 2 are acquired by the reception section 12 and stored in the frame holding section 11. Then, the frames stored in the frame holding section 11 are sequentially transmitted to the communication device 3 based on the control signal output by the transmission control section 14. The transmission control section 14 initially outputs the control signal at the repetition period of T clocks. Further, the transmission control section 14 refers to the frame holding section 11 whenever a period of N×T clocks elapses, and acquires the number of waiting frames. When the number of waiting frames is equal to K, at least some of the transmission intervals are each made shorter than T clocks, whereby the control signal is output N+K times during the next period of N×T clocks.

For example, although the clock frequency of the communication device 2 and that of the communication device 10 are identical in theory or in specifications, let it be assumed that the clock frequency of the communication device 10 is slower due to clock error. In this case, when the communication device 10 is put into service, the number of waiting frames stored in the frame holding section 11 progressively increases. However, when N×T clocks have elapsed, the transmission interval of the control signal is adjusted by the transmission control section 14. As a consequence, the increase in the number of waiting frames is stopped.

As described above, even when the operating speed of the communication device 10 is slower than that of the communication device 2 due to clock error, it is possible to automatically suppress the increase of frames in queue, thereby preventing the buffer memory from overflowing. Therefore, even when the utilization factor of the transmission line 4a (4b) is high, discarding of frames is prevented, which makes it possible to improve the quality of the network. Further, since the transmission rate of frames is increased by an extent corresponding to a clock error, adverse influence of compensation for the clock error on the communication device 3 can be minimized.

To shorten the intervals of outputting the control signal, there may be employed, for example, a method of uniformly shortening the intervals of outputting the control signal, such that each interval of adjacent ones of N+K transmissions of the control signal is reduced by one clock at the maximum. According to this method, adverse influence on the receiving-end communication device can be further reduced. Further, even when the performance of a communication device does not permit a sharp increase in the frame transmission rate, the present invention can be applied thereto.

Another method of shortening the intervals of outputting the control signal, for example, is to select K idle times for transmission of the control signal, over a period of N×T clocks, without changing the original timing of outputting the control signal at the repetition period of T clocks. According to this method, strict control on a clock-by-clock basis is not required, which facilitates realization of a circuit equipped with the above-described functions.

In the following, the embodiments of the present invention will be described with reference to drawings.

First Embodiment

Figure 2:
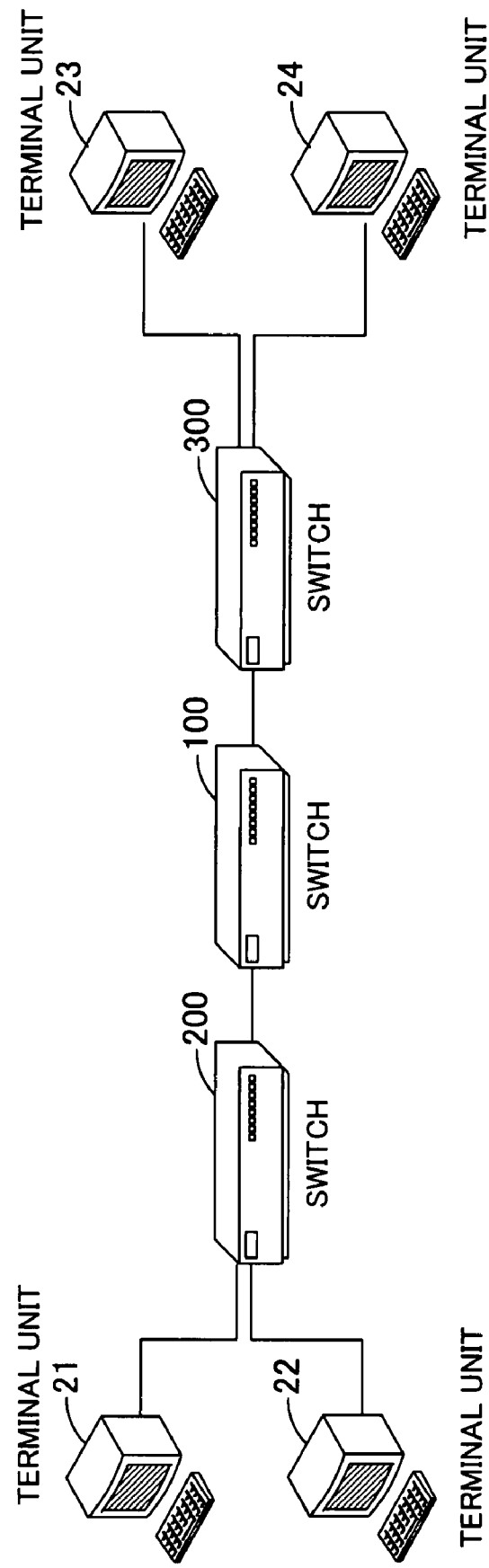
FIG. 2 is a diagram of a system architecture of a frame transfer system incorporating a layer 2 switch as a communication device according to a first embodiment of the present invention.

FIG. 2 is a diagram showing a system architecture of a frame transfer system incorporating a layer 2 switch as a communication device according to a first embodiment of the present invention. In the frame transfer system, a plurality of layer 2 switches relay data link layer frames so as to enable data transmission and reception between terminal units.

The frame transfer system shown in FIG. 2 is comprised of switches 100, 200, and 300, and terminal units 21, 22, 23, and 24. Each of the switches 100, 200, and 300 is implemented by a layer 2 switch. The terminal units 21, 22, 23, and 24 are those used by users. The switch 100 is connected to the switches 200 and 300. The switch 200 is connected to the terminal units 21 and 22. The switch 300 is connected to the terminal units 23 and 24.

The switches 100, 200, and 300 relay frames from a transmitting-end terminal unit to a destination terminal unit according to a MAC (Media Access Control) address contained in the frames. For example, in a case where the terminal unit 21 transmits frames to the terminal unit 22, the frames are transferred from the terminal unit 21 through the switch 200 to the terminal unit 22. Further, in a case where the terminal unit 21 transmits frames to the terminal unit 23, the frames are transferred from the terminal unit 21 through the switch 200, the switch 100, and the switch 300, to the terminal unit 23.

Figure 3:
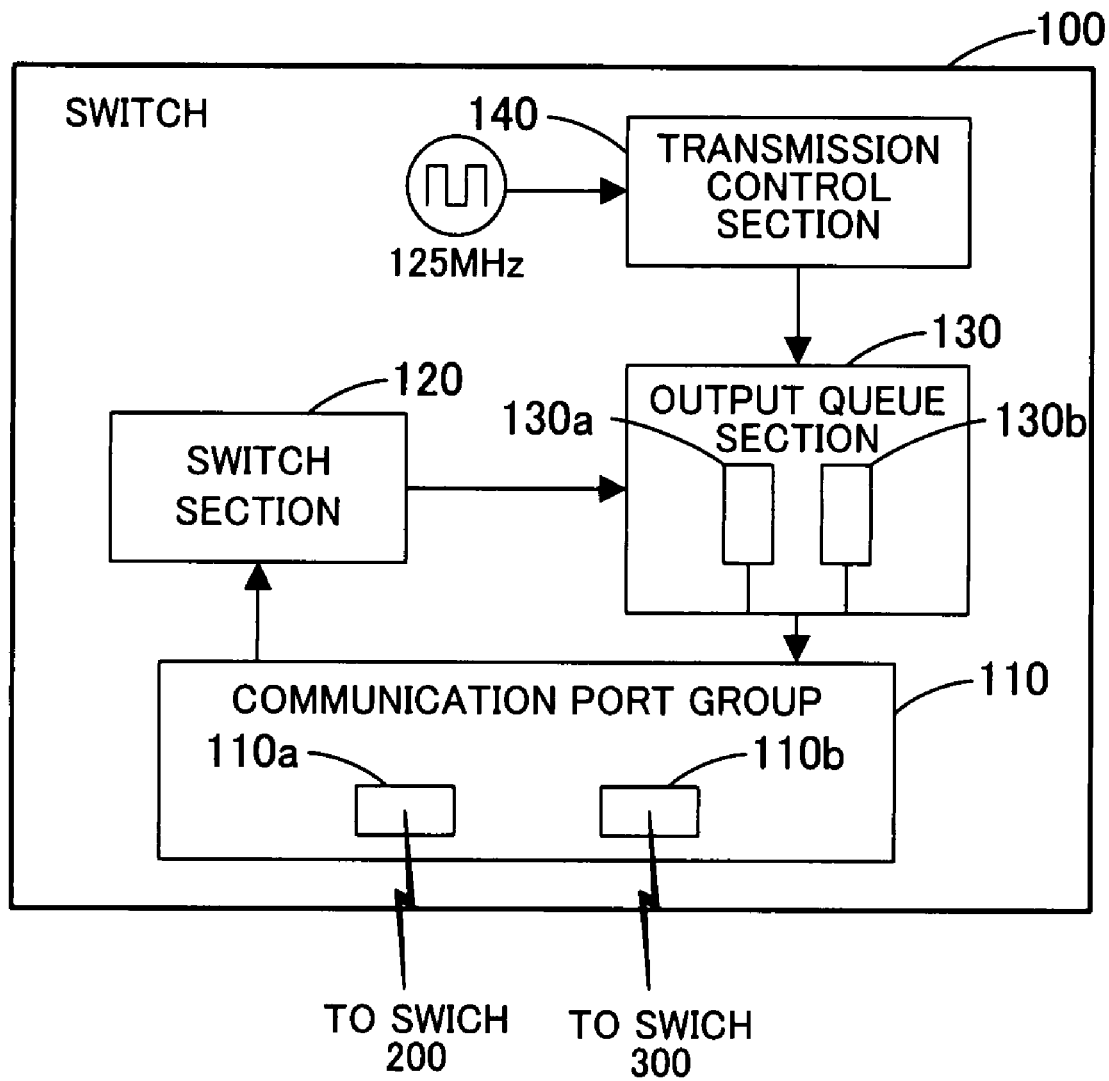
FIG. 3 is a functional block diagram of the switch.

FIG. 3 is a functional block diagram of a switch. Although FIG. 3 shows the functional block configuration of the switch 100, the switches 200 and 300 can also have the same functional block configuration as the switch 100. The switch 100 is comprised of a communication port group 110, a switch section 120, an output queue section 130, and a transmission control section 140.

The communication port group 110 is comprised of two communication ports 110a and 110b. The communication ports 110a and 110b are respectively connected to communication ports of another switch via a physical link (cable). Specifically, the communication port 110a is connected to a communication port of the switch 200. The communication port 110b is connected to a communication port of the switch 300. The communication ports 110a and 110b are capable of performing frame transmission/reception at a speed of 100 Mbps at the maximum.

The switch section 120 acquires each frame having reached the communication port 110a or 110b. Then, the switch section 120 determines a communication port to which the frame should be output, by referring to a destination MAC address of the acquired frame. Specifically, the switch section 120 determines the communication port 110a as a port from which a frame addressed to the terminal unit 21 or 22 is to be output. Similarly, the switch section 120 determines the communication port 110b as a port from which a frame addressed to the terminal unit 23 or 24 is to be output. Thereafter, the switch section 120 designates the determined communication port and sends the frame to the output queue section 130.

The output queue section 130 has two output queue buffers in a one-to-one correspondence with the respective communication ports forming the communication port group 110. Specifically, the output queue section 130 is comprised of an output queue buffer 130a associated with the communication port 110a and an output queue buffer 130b associated with the communication port 110b. Each of the output queue buffers 130a and 130b is implemented by a FIFO memory. The output queue section 130 stores frames received from the switch section 120 in one of the output queue buffers associated with the designated communication port. Further, the output queue section 130 reads out each frame from the output queue buffer 130a or 130b in timing specified by the transmission control section 140, and outputs the frame to an associated one of the communication ports 110a and 110b.

The transmission control section 140 instructs the output queue section 130 of timing for outputting each frame. Further, the transmission control section 140 acquires the number of waiting frames in each of the output queue buffers 130a and 130b at intervals of a predetermined number of clocks. The transmission control section 140 recalculates timing for outputting frames, whenever the number of waiting frames is acquired. It should be noted that the transmission control section 140 operates in accordance with a clock signal of 125 MHz. The clock signal can have a clock error of 100 ppm at the maximum.

Figure 4:
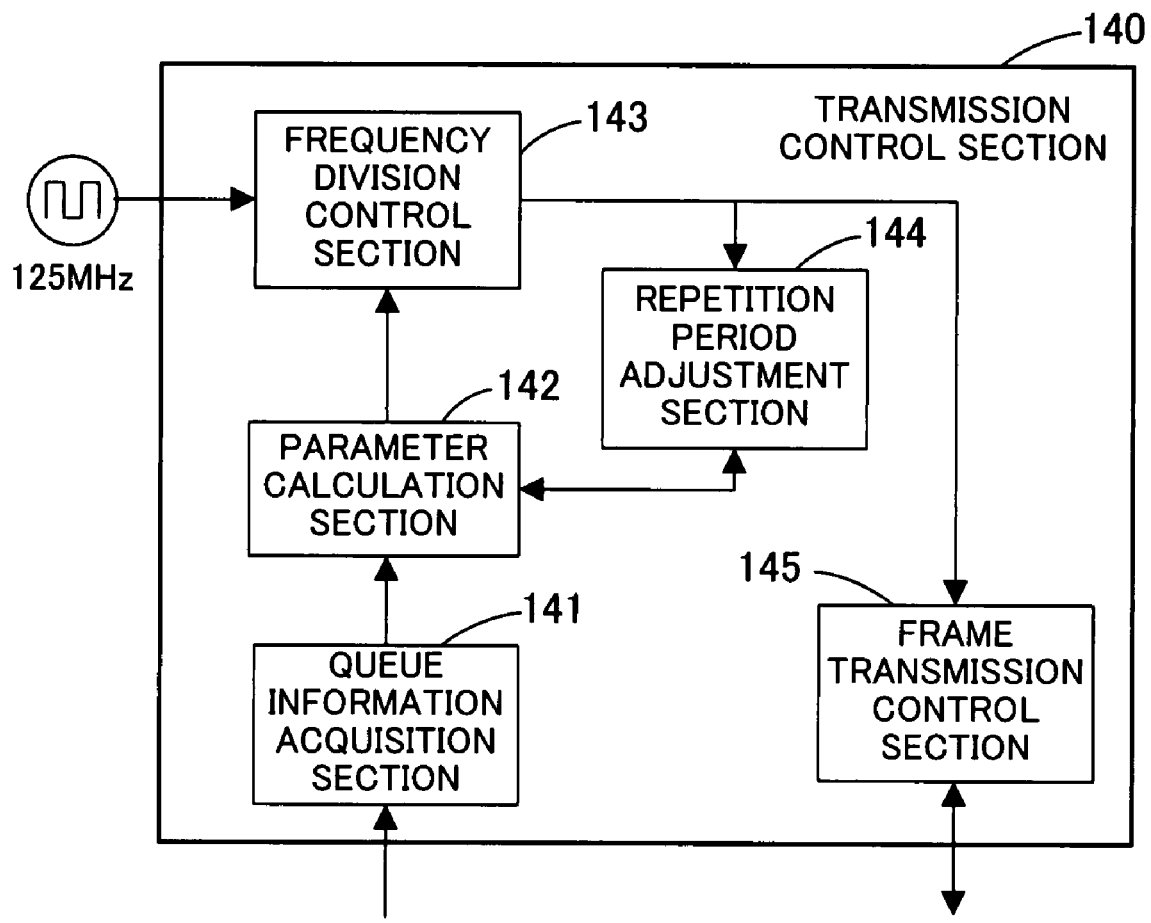
FIG. 4 is a functional block diagram of a transmission control section of the switch according to the first embodiment.

FIG. 4 is a functional block diagram of the transmission control section of the switch 100 as the communication device according to the first embodiment. The transmission control section 140 is comprised of a queue information acquisition section 141, a parameter calculation section 142, a frequency division control section 143, a repetition period adjustment section 144, and a frame transmission control section 145.

The queue information acquisition section 141 acquires the number of waiting frames in each of the output queue buffers 130a and 130b from the output queue section 130 whenever a one million-frame time period elapses. It should be noted that the one-frame time period is equal to the minimum number of clocks required for receiving one frame. The one-frame time period can be calculated by the following equation:

one-frame time period (clocks)=shortest frame length (bits)÷physical transmission rate (bps)×clock frequency (Hz)

For example, assuming that the physical transmission rate is 100 Mbps, the clock frequency 125 MHz, and the shortest frame length 84 bytes, the one-frame time period is equal to 840 clocks. In the following description of the present embodiment, it is assumed that that the one-frame time period is equal to 840 clocks.

The parameter calculation section 142 acquires the number of waiting frames in each of the output queue buffers 130a and 130b from the queue information acquisition section 141 and recalculates timing for carrying out frame output processing for each output queue buffer. More specifically, assuming that the number of waiting frames is equal to Y, the timing is recalculated such that frame output processing is executed 1,000,000+Y times over the following one million-frame time period (=840×1,000,000 clocks).

Specifically, the parameter calculation section 142 calculates the number of times (A times) of frame output processing executed at a $1/839$ divided frequency (which is obtained by dividing the clock frequency by 839) and the number of times (B times) of frame output processing executed at a $1/840$ divided frequency (which is obtained by dividing the clock frequency by 840). The parameters A and B have a relationship expressed by the following equations:

$$839 \times A + 840 \times B = 840 \times \text{one million}$$

$$A + B = \text{one million} + Y$$

Therefore, the parameter calculation section 142 can determine the parameters A and B by the following equations:

$$A = 840 \times Y$$

$$B = \text{one million} - 839 \times Y$$

The frequency division control section 143 divides the frequency of a clock signal of 125 MHz by 839 or 840, and outputs a transmission period signal at a repetition period corresponding to the divided frequency. Specifically, the transmission period signal is output at every 839 clocks A times, and is output at every 840 clocks B times, based on the respective values of the parameters A and B calculated by the parameter calculation section 142.

The repetition period adjustment section 144 increments the count of an internal counter by 1 whenever the transmission period signal output from the frequency division control section 143 is received. Then, when the count of the internal counter reaches A+B, the internal counter is initialized to 0, and an adjustment period end signal is transmitted to the parameter calculation section 142.

The frame transmission control section 145 executes the frame output processing whenever the transmission period signal output from the frequency division control section 143 is received. If all frames stored in the output queue buffers 130a and 130b have a fixed length, the frame transmission control section 145 is only required to output one frame whenever the transmission period signal is received. In general, however, frames transmitted/received via a transmission line are of variable length. Therefore, the frame transmission control section 145 carries out frame output processing by taking frame lengths into account. Processing for outputting variable-length frames will be described in detail hereinafter.

Next, processing executed by the system configured as above will be described in detail.

Figure 5:
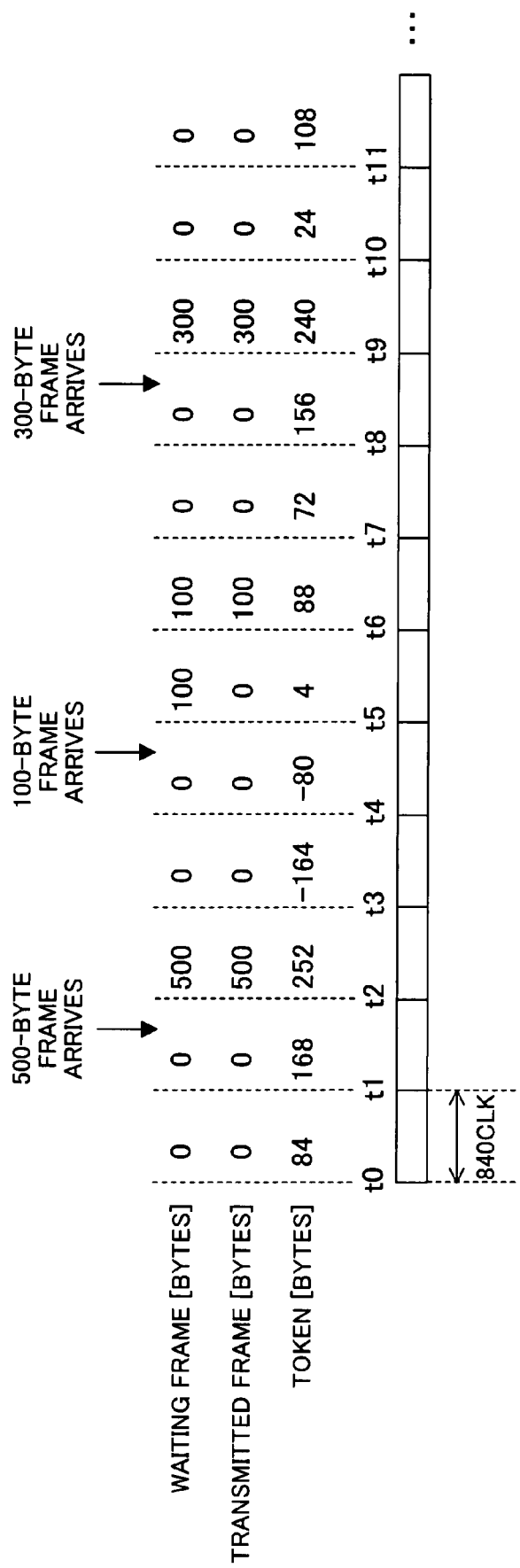
FIG. 5 is a diagram illustrating timing for outputting variable length frames.

FIG. 5 is a diagram illustrating timing for outputting variable-length frames. Although the timing diagram in FIG. 5 shows a case where the transmission period signal is output at a repetition period of 840 clocks, this timing can also be applied to a case where the transmission period signal is output at a repetition period of 839 clocks.

The frame transmission control section 145 holds an integer value referred to as a "token". The initial value of the token is equal to 84, and the token is incremented by 84 upon receipt of the transmission period signal. In a case where there remain waiting frames when the transmission period signal is received, the frame transmission control section 145 determines whether the token is positive or negative. If the token is not negative, one of the waiting frames is output, whereafter the token is decremented by the frame length of the output frame. If the token is negative, no waiting frame is output.

In the example illustrated in FIG. 5, times t0, t1, t2, . . . , indicate respective reception times at which the transmission period signal is received. Between the time t1 and the time t2, a 500-byte frame arrives, and at the time t2, the frame is output. Similarly, between the time t8 and the time t9, a 300-byte frame arrives, and at the time t9, the frame is output. On the other hand, between the time t4 and the time t5, a 100-byte frame arrives, but since the token is negative (which means the preceding 500-byte frame is being transmitted) at the time 4, the 100-byte frame is output not at the time t5, but at the time t6.

The processing for outputting variable-length frames can be achieved by the above-described method. In the present embodiment, however, it is not required to limit the method of outputting variable-length frames to the above-described method, but a different method may be employed.

Next, a description will be given of frame transmission control executed by the transmission control section 140. In the following, only a case where frames having reached the communication port 110a are output from the communication port 110b, i.e. a case where waiting frames stored in the output queue buffer 130b are output will be described. Waiting frames stored in the output queue buffer 130a can be output by the same processing.

Figure 6:
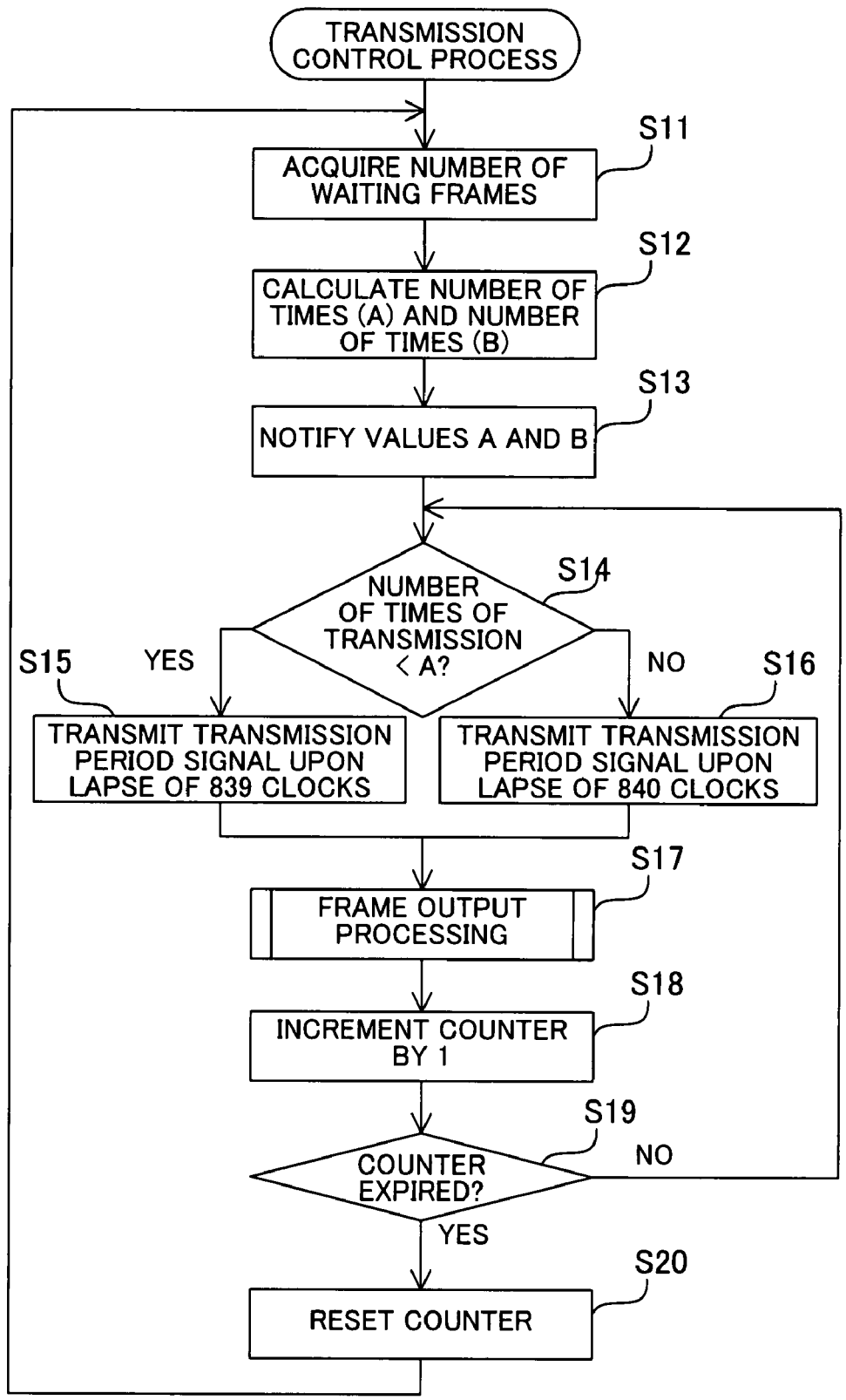
FIG. 6 is a flow diagram of a transmission control process executed by the switch according to the first embodiment.

FIG. 6 is a flow diagram of a transmission control process executed by the switch as the communication device according to the first embodiment. In the following, the process shown in FIG. 6 will be described in the order of step numbers.

[Step S11] Upon reception of the adjustment period end signal from the repetition period adjustment section 144, the parameter calculation section 142 acquires the number of waiting frames stored in the output queue buffer 130b from the queue information acquisition section 141.

[Step S12] The parameter calculation section 142 calculates the number of times (A times) of the frame output processing to be executed at the 1/839 divided frequency and the number of times (B times) of the frame output processing to be executed at the 1/840 divided frequency, by the aforementioned equations using the number of waiting frames acquired in the step S11.

[Step S13] The parameter calculation section 142 delivers the values of the respective parameters A and B calculated in the step S12 to the frequency division control section 143 and the repetition period adjustment section 144.

[Step S14] The frequency division control section 143 determines whether or not the number of times of transmission of the transmission period signal executed after acquisition of the values of the parameters A and B from the parameter calculation section 142 in the step S13 is less than A. If the number of times of transmission is less than A, the process proceeds to a step S15, whereas the number of times of the transmission is not less than A, the process proceeds to a step S16.

[Step S15] Upon the lapse of 839 clocks after the immediately preceding transmission of the transmission period signal, the frequency division control section 143 transmits the transmission period signal to the repetition period adjustment section 144 and the frame transmission control section 145.

[Step S16] Upon the lapse of 840 clocks after the immediately preceding transmission of the transmission period signal, the frequency division control section 143 transmits the transmission period signal to the repetition period adjustment section 144 and the frame transmission control section 145.

[Step S17] Upon reception of the transmission period signal from the frequency division control section 143, the frame transmission control section 145 carries out processing for outputting a variable-length frame according to the method described hereinbefore. More specifically, when the token is not negative, the frame transmission control section 145 instructs the output queue section 130 to transmit a frame stored in the output queue buffer 130b, and then acquires the frame length of the transmitted frame from the output queue section 130.

[Step S18] Upon reception of the transmission period signal from the frequency division control section 143, the repetition period adjustment section 144 increments the internal counter by 1.

[Step S19] The repetition period adjustment section 144 determines whether or not the internal counter has expired, i.e. whether or not the count of the internal counter has reached the total value (A+B) of the parameters A and B acquired in the step S13. If the internal counter has expired, the process proceeds to a step S20, whereas if the internal counter has not expired, the process returns to the step S14.

[Step S20] The repetition period adjustment section 144 initializes the internal counter to 0, and then transmits the adjustment period end signal to the parameter calculation section 142.

As described above, the parameter calculation section 142 acquires the number of waiting frames whenever the one million-frame time period elapses, and calculates the number of times of frame output processing to be executed at the 1/839 divided frequency and the number of times of frame output processing to be executed at the 1/840 divided frequency according to the acquired number of waiting frames. Thereafter, the frequency division control section 143 transmits the transmission period signal indicative of a transmission repetition period corresponding to the 1/839 divided frequency or the 1/840 divided frequency according to the parameters calculated by the parameter calculation section 142. Then, the frame transmission control section 145 executes variable-length frame output processing whenever the transmission period signal is received.

FIGS. 7A and 7B are diagrams illustrating timing of transmission of the transmission period signal used in the first embodiment. FIG. 7A illustrates timing in a case where adjustment is not performed according to the number of waiting frames, while FIG. 7B illustrates timing in a case where adjustment is performed according to the number of waiting frames. In the illustrated example, it is assumed that the clock frequency of the switch 100 is slower than that of the switch 200 by Y ppm.

As shown in FIG. 7A, when the adjustment is not performed, the transmission period signal is output one million times at a repetition period of 840 clocks. As a consequence, frame output processing is executed one million times over a one million-frame time period. On the other hand, when the adjustment is performed as shown in FIG. 7B, the transmission period signal is transmitted 840×Y times at a repetition period of 839 clocks, and one million–839×Y times at a repetition period of 840 clocks. As a consequence, frame output processing is executed one million+Y times over the one million-frame time period.

FIGS. 8A and 8B are diagrams showing time series changes in the number of waiting frames in the output queue buffer 130b. FIG. 8A shows time series change in the case where adjustment has not been performed according to the number of waiting frames, while FIG. 8B shows time series change in the case where adjustment has been performed according to the number of waiting frames. In the present example, it is assumed that the clock frequency of the switch 100 is slower than that of the switch 200 by Y ppm, and the number of frames storable in the output queue buffer 130b is equal to 3.5×Y.

As shown in FIG. 8A, when the adjustment is not performed, the number of waiting frames in the output queue buffer 130b increases by Y at the maximum, every one million-frame time period. Therefore, if the utilization factor of the transmission line continuously remains high, an overflow of the output queue buffer 130b occurs after the lapse of a 3.5 million-frame time period, which causes discarding of frames. On the other hand, as shown in FIG. 8B, when the adjustment is performed, the number of waiting frames in the output queue buffer 130b increases to Y after the lapse of a one million-frame time period, but after that, intervals of frame output processing are adjusted, whereby the increase of waiting frames is stopped. This makes it possible to prevent an overflow of the output queue buffer 130b and resultant discarding of frames.

As described above, with the configuration of the switch according to the first embodiment, even if the operating speed of a receiving-end communication device is slower than that of a transmitting-end communication device due to clock error, it is possible to automatically suppress increase of frames in queue and a resultant overflow of the output queue buffers. Thus, even when the utilization factor of a transmission line is high, discarding of frames is prevented, which makes it possible to further improve the quality of the network.

In particular, since some of the intervals at which frame output processing is executed are shortened by one clock, it is possible to minimize adverse influence on another switch. Further, the present embodiment is also applicable when the performance of a switch does not allow sharp increase of the frame transmission rate.

An increase in the frame transmission rate of the switch 100 can produce untransmitted frames anew in the switches 200 and 300 as receiving ends. In this case, it is possible to solve queueing delay of frames by causing the switches 200 and 300 to perform the same processing as described above. This adjustment of the transmission rate can cause occurrence of a chain of events between switches. However, the events are supposed to stop after occurring a limited number of times. This is because clock errors assume positive and negative random values, and when the clock errors of a number of switches are summed up, they cancel each other and a total value thereof becomes equal to 0.

Second Embodiment

Next, a second embodiment of the present invention will be described with reference to FIGS. 9 to 11B. In the following, a description will be mainly given of different points from the first embodiment, and description of elements identical or similar to those described in the first embodiment is omitted. The second embodiment is distinguished from the first embodiment in that the method of adjusting the transmission period signal is replaced by another method.

A system architecture of a frame transfer system incorporating a layer 2 switch as a communication device according to the second embodiment is identical to that described in the first embodiment with reference to FIG. 2. The arrangement of the switch according to the second embodiment is identical to that of the switch according to the first embodiment shown in FIG. 3. In the second embodiment, however, the internal architecture and functions of the transmission control section 140 is replaced by those of a transmission control section 140a described below.

Figure 9:
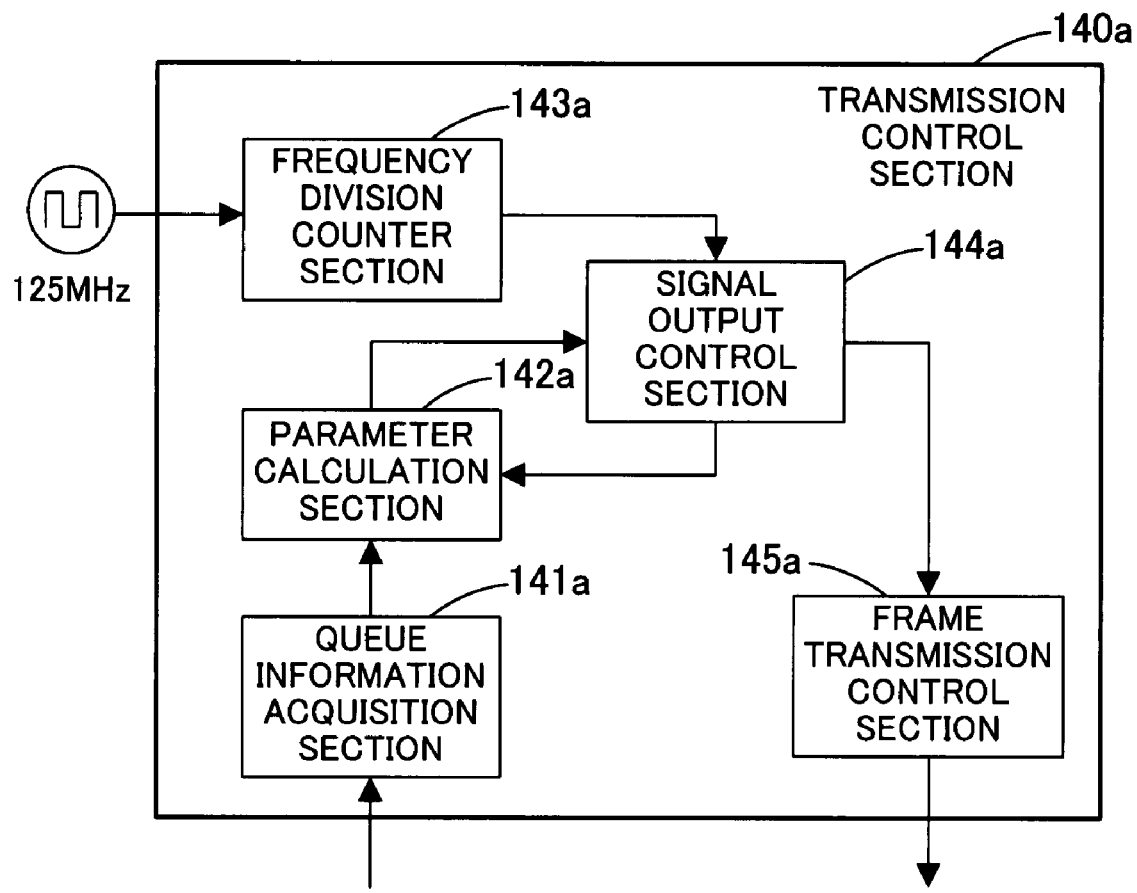
FIG. 9 is a functional block diagram of a transmission control section of a layer 2 switch as a communication device according to a second embodiment of the present invention.

FIG. 9 is a functional block diagram of the transmission control section of the switch according to the second embodiment. The transmission control section 140a is comprised of a queue information acquisition section 141a, a parameter calculation section 142a, a frequency division counter section 143a, a signal output control section 144a, and a frame transmission control section 145a.

The queue information acquisition section 141a acquires the number of waiting frames in each of the output queue buffers 130a and 130b from the output queue section 130 every one million-frame time period. A one-frame time period is assumed to be equal to 840 clocks as in the first embodiment.

The parameter calculation section 142a acquires the number of waiting frames in each of the output queue buffers 130a and 130b from the queue information acquisition section 141a and recalculates timing for carrying out frame output processing for each output queue buffer. Specifically, the timing is configured such that part of the frame output processing is carried out at a repetition period of 420 clocks equal to a half-frame time period, and the remainder of the frame output processing is carried out at a repetition period of 840 clocks equal to the one-frame time period. The number of times (A times) of frame output processing to be executed at the repetition period of 420 clocks can be calculated by the following equation:

$$A = 2 \times Y$$

The frequency division counter section 143a divides the frequency of 125 MHz of the clock signal by 420 to obtain a 1/420 frequency-divided signal, and transmits the 1/420 frequency-divided signal to the signal output control section 144a.

The signal output control section 144a increments the count of the internal counter by 1 whenever the 1/420 frequency-divided signal is received from the frequency division counter section 143a. Until the count of the internal counter reaches A, the signal output control section 144a transmits the transmission period signal in synchronism with reception of the 1/420 frequency-divided signal. Then, after the count of the internal counter exceeds A, the signal output control section 144a transmits the transmission period signal in synchronism with reception of the 1/420 frequency-divided signal at each odd-numbered repetition period.

The frame transmission control section 145a executes frame output processing whenever the transmission period signal is received from the signal output control section 144a. Details of the frame output processing are the same as those of the frame output processing described in the first embodiment.

Next, a detailed description will be given of processing executed in the system configured as above. As in the first embodiment, a case will be described where frames having reached the communication port 110a are output from the communication port 110b, i.e. a case where waiting frames stored in the output queue buffer 130b are output. Waiting frames stored in the output queue buffer 130a can be output by the same processing.

Figure 10:
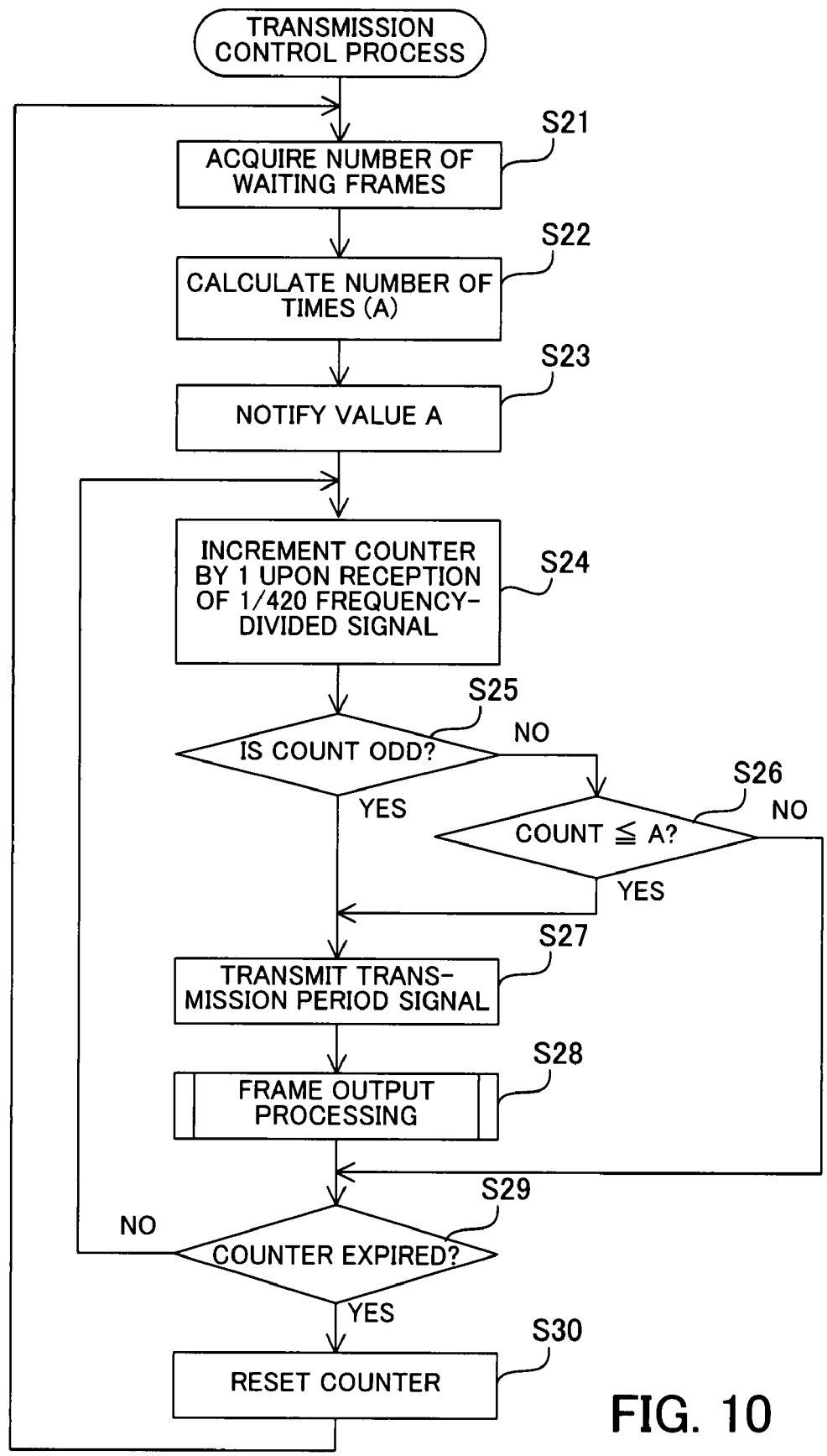
FIG. 10 is a flow diagram of a transmission control process executed by the switch according to the second embodiment.

FIG. 10 is a flow diagram of a transmission control process executed by the switch as the communication device according to according to the second embodiment. In the following, the process shown in FIG. 10 will be described in the order of step numbers.

[Step S21] Upon reception of the adjustment period end signal from the signal output control section 144a, the parameter calculation section 142a acquires the number of waiting frames stored in the output queue buffer 130b from the queue information acquisition section 141a.

[Step S22] The parameter calculation section 142a calculates the number of times (A times) of frame output processing to be executed at a 1/420 divided frequency, by the aforementioned equation using the number of waiting frames acquired in the step S21.

[Step S23] The parameter calculation section 142a notifies the value of the parameter A calculated in the step S22 to the signal output control section 144a.

[Step S24] The signal output control section 144a awaits reception of the 1/420 frequency-divided signal from the frequency division counter section 143a, and upon reception thereof, increments the internal counter by 1.

[Step S25] The signal output control section 144a determines whether or not the current count of the internal counter is an odd number. If the count of the internal counter is an odd number, the process proceeds to a step S27, whereas if the count is an even number, the process proceeds to a step S26.

[Step S26] The signal output control section 144a determines whether the current count of the internal counter is not larger than the value of the parameter A acquired in the step S23. If the count of the internal counter is not more than the value of the parameter A, the process proceeds to a step S27, whereas if the count of the internal counter is more than the value of the parameter A, the process proceeds to a step S29.

[Step S27] The signal output control section 144a transmits the transmission period signal to the frame transmission control section 145a.

[Step S28] Upon reception of the transmission period signal from the signal output control section 144a, the frame transmission control section 145a carries processing for outputting a variable-length frame according to the method described hereinbefore. More specifically, when the token is not negative, the frame transmission control section 145a instructs the output queue section 130 to transmit a frame stored in the output queue buffer 130b, and then acquires the frame length of the transmitted frame from the output queue section 130.

[Step S29] The signal output control section 144a determines whether or not the internal counter has expired, i.e. whether or not the count of the internal counter has reached one million. If the internal counter has expired, the process proceeds to a step S30, whereas if the internal counter has not expired, the process returns to the step S24.

[Step S30] The signal output control section 144a initializes the internal counter to 0, and then transmits the adjustment period end signal to the parameter calculation section 142a.

As described above, the parameter calculation section 142a acquires the number of waiting frames every one million-frame time period, and calculates the number of times of frame output processing to be executed at the 1/420 divided frequency, according to the acquired number of waiting frames. Thereafter, the signal output control section 144a transmits the transmission period signal at the 1/420 divided frequency or at the 1/840 divided frequency according to the parameter calculated by the parameter calculation section 142a. The frame transmission control section 145a executes variable-length frame output processing whenever the transmission period signal is received.

FIGS. 11A and 11B are diagrams illustrating timing of transmission of the transmission period signal used in the second embodiment. FIG. 11A illustrates timing in a case where adjustment is not performed according to the number of waiting frames, while FIG. 11B illustrates timing in a case where adjustment is performed according to the number of waiting frames. In the illustrated example, it is assumed that the clock frequency of the switch 100 is slower than that of the switch 200 by Y ppm.

As shown in FIG. 11A, when the adjustment is not performed, the transmission period signal is transmitted one million times at a repetition period of 840 clocks. As a consequence, frame output processing is executed one million times over a one million-frame time period. On the other hand, as shown in FIG. 11B, when the adjustment is performed, the transmission period signal is transmitted 2×Y times at a repetition period of 420 clocks, and 2×one million− 2×Y times at a repletion period of 840 clocks. As a consequence, frame output processing is executed one million+Y times over the one million-frame time period.

A manner of time series changes in the number of waiting frames in the output queue buffer 130b is the same as that of the time series changes described in the first embodiment shown in FIGS. 8A and 8B. More specifically, when the adjustment is performed, the increase of waiting frames in the output queue buffer 130b is stopped upon the lapse of the one million-frame time period, which makes it possible to prevent an overflow of the output queue buffer 130b and resultant discarding of frames.

As described above, with the configuration of the switch according to the second embodiment, even if the operating speed of a receiving-end communication device is slower than that of a transmitting-end communication device due to clock error, it is possible to automatically suppress the increase of frames in queue and a resultant overflow of the output queue buffers. Thus, even when the utilization factor of an associated transmission line is high, discarding of frames is prevented, which makes it possible to further improve the quality of the network.

In particular, since the transmission period signal is output at each idle time for transmission without changing the original timing for frame output processing, it is not required to perform strict control on a clock-by-clock basis, which facilitates realization of a circuit equipped with the above-described functions.

Although in the above-described first and second embodiments, the layer 2 switch is used as the communication device for frame transmission and reception, other kinds of communication devices provided with the function for frame transmission and reception may be employed. For example, a router or the like which is capable of performing processing in a layer higher than the data link layer may be used. In this case, processing in the layer higher than the data link layer is additionally carried out between a time when a frame is received and a time when the frame is stored in an output queue buffer.

According to the present invention, the number of waiting frames is acquired at a repetition period of a predetermined number of clocks, and intervals at which the control signal is output are adjusted to increase the frame transmission rate by a rate corresponding to the acquired number of waiting frames. As a consequence, even if the operating speed of a receiving-end communication device is slower than that of a transmitting-end communication device due to clock error, it is possible to automatically suppress the increase of frames in queue and prevents the buffer memory from overflowing. Thus, even when the utilization factor of the transmission line is high, discarding of frames is prevented, which makes it possible to further improve the quality of the network. Moreover, since the frame transmission rate is increased by a rate corresponding to the clock error, adverse influence of the compensation for the clock error on other communication devices can be minimized.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication device that receives and transmits frames asynchronously via a transmission line, comprising:
    frame holding means for storing the frames awaiting transmission;
    transmission means for sequentially taking out the frames from said frame holding means and outputting the frames to the transmission line, based on a control signal indicative of timing for transmitting the frames; and
    transmission control means for initially transmitting the control signal at a repetition period of T clocks and acquiring a number of waiting frames in said frame holding means every N×T clocks, where T represents an integer not smaller than 2 and N represents an integer not smaller than 2,
    wherein, when the number of waiting frames is equal to K, said transmission control means transmits the control signal A times at a repetition period of T−1 clocks and B times at a repetition period of T clocks during next N×T clocks, where K represents an integer not smaller than 1, and
    A and B are calculated based on K so that the control signal is transmitted N+K times during the next N×T clocks.

2. A communication device that receives and transmits frames asynchronously via a transmission line, comprising:
    frame holding means for storing the frames awaiting transmission;
    transmission means for sequentially taking out the frames from said frame holding means and outputting the frames to the transmission line, based on a control signal indicative of timing for transmitting the frames; and
    transmission control means for initially transmitting the control signal at a repetition period of T clocks and acquiring a number of waiting frames in said frame holding means every N×T clocks, where T represents an integer not smaller than 2 and N represents an integer not smaller than 2,
    wherein, when the number of waiting frames is equal to K, said transmission control means transmits the control signal at the repetition period of T clocks, and in addition thereto, transmits the control signal by selecting K idle times for transmission, to thereby transmit the control signal N+K times during next N×T clocks, where K represents an integer not smaller than 1,
    said transmission control means includes divider means for generating a frequency-divided signal at a repetition period of T÷2 clocks, and
    initially, said transmission control means transmits the control signal whenever said frequency-divided signal is generated twice, and when the number of waiting frames is equal to K, said transmission control means selects the K idle times for transmission from times of generation of the frequency-divided signal.

3. A method of communication executed by a communication device that receives and transmits frames asynchronously via a transmission line, comprising:
    initially transmitting a control signal indicative of timing for transmitting transmission-awaiting frames to the transmission line at a repetition period of T clocks after sequentially taking out the transmission-awaiting frames stored in a memory provided in the communication device, where T represents an integer not smaller than 2;
    acquiring a number of waiting frames in the memory every N×T clocks, where N represents an integer not smaller than 2; and
    transmitting the control signal A times at a repetition period of T−1 clocks and B times at a repetition period of T clocks during next N×T clocks when the number of waiting frames is equal to K, where K represents an integer not smaller than 1, wherein A and B are calculated based on K so that the control signal is transmitted N×K times during the next N×T clocks.

4. A communication device that receives and transmits frames asynchronously via a transmission line, comprising:
   a frame holding section to store the frames awaiting transmission;
   a transmission section to sequentially take out the frames from said frame holding section and to output the frames to the transmission line, based on a control signal indicative of timing for transmitting the frames; and
   a transmission control section to initially transmit the control signal at a repetition period of T clocks and to acquire a number of waiting frames in said frame holding section every N×T clocks, where T represents an integer not smaller than 2 and N represents an integer not smaller than 2,
   wherein, when the number of waiting frames is equal to K, said transmission control section transmits the control signal A times at a repetition period of T−1 clocks and B times at a repetition period of T clocks during next N×T clocks, where K represents an integer not smaller than 1, and
   A and B are calculated based on K so that the control signal is transmitted N+K times during the next N×T clocks.

5. A method of communication executed by a communication device that receives and transmits frames asynchronously via a transmission line, comprising:
   initially transmitting a control signal indicative of timing for transmitting transmission-awaiting frames to the transmission line at a repetition period of T clocks after sequentially taking out the transmission-awaiting frames stored in a memory provided in the communication device, where T represents an integer not smaller than 2;
   acquiring a number of waiting frames in the memory every N×T clocks, where N represents an integer not smaller than 2; and
   transmitting the control signal at the repetition period of T clocks, and in addition thereto, transmitting the control signal by selecting K idle times when the number of waiting frames is equal to K, to thereby transmit the control signal N+K times during next N×T clocks, where K represents an integer not smaller than 1,
   wherein the communication device generate a frequency-divided signal at a repetition period of T÷2 clocks, and
   initially, the communication device transmits the control signal whenever said frequency-divided signal is generated twice, and when the number of waiting frames is equal to K, the communication device selects the K idle times for transmission from times of generation of the frequency-divided signal.

6. A communication device that receives and transmits frames asynchronously via a transmission line, comprising:
   a frame holding section to store the frames awaiting transmission;
   a transmission section to sequentially take out the frames from said frame holding section and to output the frames to the transmission line, based on a control signal indicative of timing for transmitting the frames; and
   a transmission control section to initially transmit the control signal at a repetition period of T clocks and to acquire a number of waiting frames in said frame holding section every N×T clocks, where T represents an integer not smaller than 2 and N represents an integer not smaller than 2,
   wherein, when the number of waiting frames is equal to K, said transmission control section transmits the control signal at the repetition period of T clocks, and in addition thereto, transmits the control signal by selecting K idle times for transmission, to thereby transmit the control signal N+K times during next N×T clocks, where K represents an integer not smaller than 1,
   said transmission control section includes a divider section to generate a frequency-divided signal at a repetition period of T÷2 clocks, and
   initially, said transmission control section transmits the control signal whenever said frequency-divided signal is generated twice, and when the number of waiting frames is equal to K, said transmission control section selects the K idle times for transmission from times of generation of the frequency-divided signal.

* * * * *

UNITED STATES PATENT AND TRADEMARK OFFICE
CERTIFICATE OF CORRECTION

PATENT NO. : 7,710,992 B2
APPLICATION NO. : 11/892144
DATED : May 4, 2010
INVENTOR(S) : Nagano Shimada It is certified that error appears in the above-identified patent and that said Letters Patent is hereby corrected as shown below:

Column 15, Line 2, change "NxK" to --N+K--.

Signed and Sealed this

Twentieth Day of July, 2010

David J. Kappos
*Director of the United States Patent and Trademark Office*